Oct. 29, 1968   R. WICK ET AL   3,407,716
EXPOSURE CONTROL DEVICE FOR PHOTOGRAPHIC CAMERAS
Filed March 10, 1966
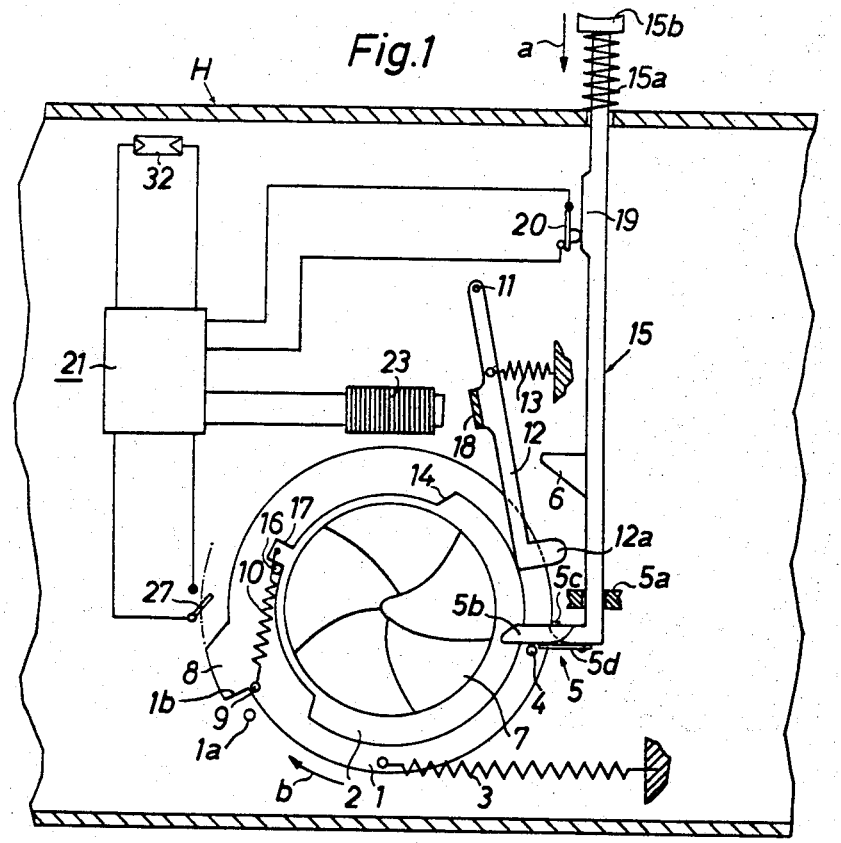
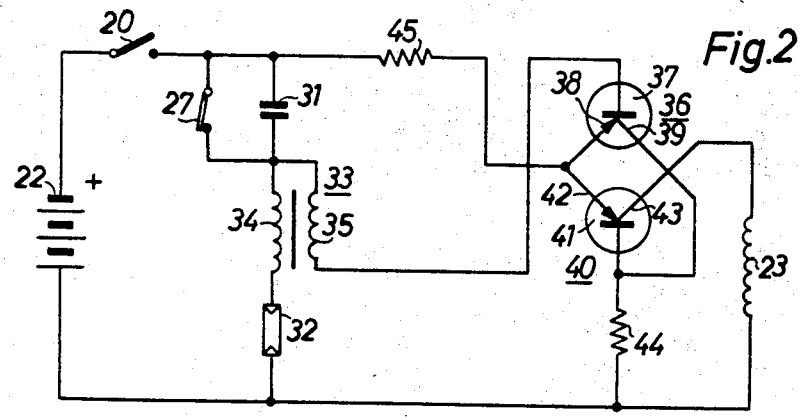
INVENTOR.
RICHARD WICK
BY FRIEDRICH BESTENREINER

United States Patent Office 3,407,716
Patented Oct. 29, 1968

3,407,716
EXPOSURE CONTROL DEVICE FOR
PHOTOGRAPHIC CAMERAS
Richard Wick and Friedrich Bestenreiner, Gruenwald, near Munich, Germany, assignors to Agfa-Gevaert Aktiengesellschaft, Leverkusen, Germany
Filed Mar. 10, 1966, Ser. No. 533,283
Claims priority, application Germany, Mar. 25, 1965,
A 48,738
10 Claims. (Cl. 95—10)

The present invention relates to photographic cameras in general, and more particularly to an improved exposure control device for photographic cameras. Still more particularly, the invention relates to improvements in an automatic control device for the shutter of a photographic camera.

It is already known to control the shutter of a camera in such a way that the exposure time is a function of the intensity of light coming from a viewed scene or subject. The control device may comprise a light-sensitive resistor, a capacitor which is charged or discharged by current flowing through the resistor, and a control element which actually terminates the exposure when the charge of the capacitor assumes a predetermined value. An important advantage of such control devices is that the exposure time can be selected as an accurate function of light intensity without resorting to complicated auxiliary equipment. However, conventional control devices of the just outlined character are not reliable under certain circumstances, especially when the intensity of incoming light is very low, i.e., when the exposure time is so long that the operator cannot make a satisfactory exposure with a camera which is held by hand. If the intensity remains constant, the operator utilizing a camera which embodies the aforedescribed conventional control device normally resorts to a separate exposure meter to determine whether or not the intensity is satisfactory to allow for taking of pictures with a camera which is held by hand.

The just described exposure control device is particularly unsatisfactory when the camera is used to take pictures with flash illumination. For example, if the normal (room) illumination is very weak and if the amount of light produced by a flash unit is small, the shutter might remain open subsequent to operation of the flash unit because the total amount of light is insufficient to cause a closing of the shutter. The latter will close automatically when the light-sensitive resistor is exposed to light of required intensity whereby the picture which was taken with flash is destroyed. On the other hand, a picture taken under less than optimum lighting conditions is often very satisfactory and should not be destroyed by the shutter's failure to close upon completed flash illumination.

Accordingly, it is an important object of the present invention to provide an exposure control device which insures that a shutter will close without fail immediately upon completion of an exposure with flash illumination.

Another object of the invention is to provide a novel electrical connection between the capacitor and the electromagnet or an analogous control element which effects or allows actual closing of the shutter upon completion of an exposure with flash light.

An additional object of the invention is to provide an electrical connection which can cause the control element to effect or allow closing of the shutter upon completion of an exposure with flash light regardless of the condition of the capacitor.

Another object of the instant invention is to provide an exposure control device which is useful for making exposures in daylight as well as for making exposures with flash illumination.

Briefly stated, one feature of the present invention resides in the provision of a photographic camera which comprises a shutter movable between open and closed positions and normally tending to assume its closed position, blocking means preferably including a suitable lever or the like which is rockable or otherwise movable into engagement with the shutter to hold the latter in open position, and an exposure control device for disengaging the blocking means from the shutter to thereby determine the exposure time. This control device comprise a light-sensitive resistor exposed to incident light, a source of electrical energy connected in series with the resistor, a capacitor connected in series with the resistor and with the source so as to be charged and discharged by current flowing through the resistor, an electromagnet operative to permit disengagement of the blocking means from the open shutter in one condition of energization (preferably in response to deenergization) and to prevent such disengagement of the blocking means from the open shutter in the other condition of energization thereof, a trigger circuit connected with the electromagnet and preferably including at least one transistor, and a transformer having a primary winding connected in series with the resistor and a secondary winding connected with the trigger circuit.

In using the camera to make exposures in normal light, the exposure is terminated when the capacitor discharges. When an exposure is made with flash illumination, the transformer causes the trigger circuit to change the condition of energization of the electromagnet and to permit disengagement of the blocking means with a predetermined delay following exposure of the resistor to flash light.

The novel features which are considered as characteristic of the invention are set forth in particular in the appended claims. The improved exposure control device itself, however, both as to its construction and its mode of operation, together with additional features and advantages thereof, will be best understood upon perusal of the following detailed description of a specific embodiment with reference to the accompanying drawings, in which:

FIG. 1 is a diagrammatic front elevational view of a camera which embodies the improved exposure control device; and FIG. 2 illustrates the electric circuit of the camera.

Referring first to FIG. 1, there is shown a portion of a still camera comprising an automatic shutter adapted to be closed by an exposure control device which embodies the present invention. The housing H of the camera carries a wall which defines a diaphragm opening normally concealed behind the blades 7 of the automatic shutter which further comprises two concentric blade displacing rings 1 and 2. The ring 1 is the opening ring and the ring 2 serves to close the shutter. The blades 7 are coupled with the rings 1 and 2 by customary pin-and-slot connections which are not shown in the drawings. If the ring 2 is rotated in a clockwise direction so that it changes its angular position with reference to the ring 1 or if the ring 1 is rotated in a counterclockwise direction to change its angular position with reference to the ring 2, the blades 7 will move apart and will define an aperture for admission of light through the diaphragm opening.

The ring 1 is biased by a helical contraction spring 3 which tends to rotate it in a counterclockwise direction, as viewed in FIG. 1, whereby a stop pin 4 of the ring 1 moves against the motion transmitting end portion 5 of a combined cocking and release member 15. The ring 1 further carries a pin 9 which is connected to one end of a helical contraction spring 10. The other end of the spring 10 is connected to a lug 17 on the ring 2 so that the latter is biased in a counterclockwise direction. When the ring 2 is free to follow the bias of the spring 10, its lug 17 abuts against a stop pin 16 on the ring 1 whereby the shutter is closed.

The member 15 is biased by a spring 15a which tends to maintain the end portion 5 in abutment with a bearing member 5a secured to the housing H. In FIG. 1, the member 15 is shown in an intermediate position in which its trip 19 closes a normally open main switch 20. The outer end of the member 15 carries an actuating element in the form of a pushbutton 15b which can be depressed by a finger (see the arrow a) to move the member 15 from its idle position whereby the end portion 5 cocks the ring 1 through the intermediary of the pin 4. Such depression of the member 15 causes the ring 1 to rotate in a clockwise direction (arrow b) until the pin 4 moves out of the path of the end portion 5 so that the spring 3 contracts and returns the ring 1 to starting or uncocked position. One end of the spring 3 is attached to the housing H.

The camera further comprises a blocking lever 12 which is rockable on a fixed pin 11 and is biased by a spring 13 which tends to rock it in a counterclockwise direction so that a projection or pallet 12a of the lever 12 extends into the path of a cam 6 provided on the member 15. The pallet 12a can be moved into the path of a shoulder 14 provided on the ring 2 to prevent rotation of this ring under the bias of the spring 10. When the pallet 12a engages the shoulder 14, a paramagnetic plate 18 (preferably consisting of soft iron) on the lever 12 can be attracted by an electromagnet 23 which is connected in circuit with the normally open main switch 20 and with a light-sensitive resistor 32 which is exposed to light coming from a viewed scene or subject so that its resistance is a function of the intensity of such light. The electric circuit of the camera further comprises a delay or control circuit 21 which will be described in connection with FIG. 2.

In order that the pallet 12a may engage the shoulder 14, the ring 2 must be rotated in a clockwise direction, as viewed in FIG. 1, and the member 15 must be depressed so that the cam 6 displaces the pallet 12a against the bias of the spring 13. Such angular displacement of the ring 2 is effected by the end portion 5 via pin 4, ring 1 and spring 10.

The electric circuit further includes a normally open working switch 27 which can be closed by a trip 8 on the ring 1 when the latter rotates (arrow b) in response to depression of the pushbutton 15b.

An arresting pin 1a engages a shoulder 1b of the ring 1 when the latter is free to return to starting position under the bias of the spring 3. The tip 5b of the end portion 5 is rockable on a pivot pin 5c and is biased by a leaf spring 5d which is weaker than the spring 3. This enables the tip 5b to turn in response to engagement with the pin 4 while the cocking member 15 moves upwardly and back to its idle position.

The mechanical operation of the structure shown in FIG. 1 is as follows:

If the operator wishes to make an exposure, he applies finger pressure against the pushbutton 15b to close the main switch 20 by means of the trip 19 as soon as the member 15 leaves its idle position by moving in the direction of the arrow a. The end portion 5 cocks the ring 1 by moving the pin 4 whereby the ring 1 turns in a clockwise direction (arrow b). Shortly before the ring 1 is fully cocked, i.e., shortly before the pin 4 leaves the path of the end portion 5, the cam 6 engages the pallet 12a of the blocking lever 12 and turns this lever against the bias of the spring 13 so that the pallet engages the shoulder 14 while the energized electromagnet 23 attracts the paramagnetic plate 18. This causes the pallet 12a to remain in engagement with the shoulder 14 and to prevent counterclockwise rotation of the ring 2. The trip 8 closes the working switch 27 before the ring 1 is fully cocked.

In response to full depression of the pushbutton 15b, the pin 4 moves away from the end portion 5 and the spring 3 contracts to return the ring 1 to its starting position, i.e. to move the shoulder 1b against the pin 1a. The bias of the spring 3 is stronger than the bias of the spring 10 so that the latter stores energy while the ring 1 rotates in a counterclockwise direction with reference to the ring 2 which latter is held by the pallet 12a. Owing to such relative movement of the rings 1 and 2, the shutter blades 7 move apart and define an aperture which admits light through the diaphragm opening and against an unexposed frame of the film, not shown. The switch 27 opens as soon as the ring 1 begins to move back to its starting position. The unit 21 opens the circuit of the electromagnet 23 with a certain delay in a manner to be described hereinafter whereby the electromagnetic field collapses and the electromagnet 23 ceases to attract the plate 18. This enables the spring 13 to rock the lever 12 in a counterclockwise direction and to withdraw the pallet 12a from engagement with the shoulder 14 so that the spring 10 contracts and returns the ring 2 to starting position in which the lug 17 abuts against the pin 16. This causes the blades 7 to close the diaphragm opening.

The member 15 returns to idle position under the bias of its spring 15a, and such return movement of the member 15 can be completed before or after the pallet 12a moves away from the shoulder 14. While moving upwardly, the tip 5b is pivoted by the pin 4 because the shoulder 1b of the ring 1 abuts against the pin 1a. Once it moves upwardly and beyond the pin 4, the tip 5b reassumes the position shown in FIG. 1 because it is biased by the spring 5d.

The exact construction of the electric circuit is shown in FIG. 2. This circuit includes a battery 22 or another suitable source of electrical energy which is connected in series with the normally open main switch 20 and light-sensitive resistor 32. The components 20, 22 and 32 are connected in series with a capacitor 31. The capacitor 31 is connected in parallel with the working switch 27 and in series with the primary winding 34 of a transformer 33. The secondary winding 35 of this transformer is connected with one terminal of the capacitor 31 and with the base 37 of a first transistor 36. The arrangement is such that the working switch 27 opens automatically at the start of an exposure, i.e., immediately after the ring 1 begins to move with reference to the ring 2.

The transistor 36 forms part of the circuit 21 (and so does the transformer 33) and this circuit further includes a second transistor 40. The two transistors are connected into a trigger circuit and the emitter 38 of the transistor 36 is connected with one pole of the battery 22 via main switch 20. The collector 39 of the transistor 36 is connected with the base 41 of the second transistor 40 and the emitter 42 of the transistor 40 is connected with one pole of the battery 22 via switch 20. The other pole of the battery 22 is connected with the collector 43 of the transistor 40 via the coil of the electromagnet 23. The base 41 of the transistor 40 is also connected with the other pole of the battery 22 through a fixed resistor 44. When the trigger circuit starts to conduct current, the electromagnet 23 is energized so that it can attract the plate 19 of the blocking lever 12. The lead connecting the battery 22 and switch 20 with the emitters 38, 42 contains a fixed resistor 45.

The circuit of FIG. 2 operates as follows:

As the operator depresses the pushbutton 15b, the trip 19 closes the main switch 20 and the trip 8 closes the switch 27 whereby the latter opens again as soon as the ring 1 begins its return movement under the bias of the spring 3. At the start of the exposure, the base 37 and the emitter 38 of the first transistor 36 have the same potential and the emitter-collector junction blocks the flow of current. The base 41 of the second transistor 40 is negative with reference to the emitter 42 so that a current flows through the coil of the electromagnet 23. Thus, the latter can attract the plate 18 and maintains the pallet 12a in blocking engagement with the shoulder 14 of the ring 2.

When the exposure is made in normal light, the capacitor 31 is charged through the light-sensitive resistor 32 until its charge reaches the trigger potential so that the emitter-collector junction of the transistor 36 begins to conduct a current. This eliminates the potential difference between the base 41 and emitter 42 so that the transistor 40 ceases to conduct current and the field of the electromagnet 23 collapses. The spring 13 then returns the lever 12 to its starting position to disengage the pallet 12a from the shoulder 14 so that the spring 10 contracts and returns the lug 17 into abutment with the pin 16 to close the shutter. The ohmic resistance of the secondary winding 35 of the transformer 33 is of no consequence because the current density is relatively low. In response to release of the pushbutton 15b, the spring 15a returns the member 15 to idle position and the trip 19 allows the main switch 20 to open. Such position of the switch 20 is shown in FIG. 2.

If the operator makes an exposure with flash illumination, the flash unit provides a flash before the capacitor 31 is fully charged. Such flash causes the resistor 32 to permit the flow of a stronger current. This relatively strong current causes the transformer 33 to transmit a strong impulse directly to the base 37 of the transistor 36 so that the field of the electromagnet 23 collapses immediately and the spring 13 is free to disengage the lever 12 from the ring 2. In other words, the ring 2 is released by the lever 12 despite the fact that the capacitor 31 is not fully charged.

The transformer 33 is of equal advantage when the capacitor 31 is fully charged to a predetermined potential at the start of an exposure and is discharged by current flowing through the light-sensitive resistor 32. The electromagnet 23 terminates the exposure when the charge of the capacitor 31 assumes a predetermined value. Furthermore, the improved circuit is equally useful if the electromagnet 23 is arranged to be energized in order to terminate the exposure and if such energization takes place as a function of light intensity through a capacitor which is charged by current flowing through a light-sensitive element and which is connected with the electromagnet by a suitable trigger circuit.

It will be seen that the provision of the circuit 21 invariably insures closing of the shutter regardless of the charge in the capacitor 31 as soon as a flash unit completes the illumination of a subject or scene. This is due to the provision of the transformer 33 whose secondary winding 35 is operatively connected with the coil of the electromagnet 23. The inertia of the circuit 21, and particularly the inertia of the mechanical components of the shutter, insures that the shutter does not close prior to completion of flash illumination. The duration of the flash is about 2 ms. In normal light, closing of the shutter is brought about by the capacitor 31. When operating with flash, the shutter will close upon completion of flash illumination substantially independently of the charge of the capacitor 31. This insures that the picture taken with flash is conserved because the circuit 21 compels the shutter to close.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a shutter movable between open and closed positions; blocking means movable into engagement with said shutter to hold the latter in open position; and an exposure control for disengaging said blocking means, comprising a light-sensitive resistor exposed to incident light, a source of electrical energy connected in series with said resistor, a capacitor connected in series with said resistor and said source so as to be charged and discharged by current flowing through said resistor, an electromagnet operative to permit disengagement of said blocking means in one condition of energization and to prevent such disengagement in the other condition of energization thereof, a trigger circuit connected with said electromagnet, and a transformer having a primary winding connected in series with said resistor and a secondary winding connected with said circuit.

2. A structure as set forth in claim 1, wherein said circuit comprises a transistor having a base connected with said secondary winding.

3. A structure as set forth in claim 2, wherein said secondary winding is further connected with one terminal of said capacitor so that said electromagnet can assume said one condition of energization in response to discharge of said capacitor.

4. A structure as set forth in claim 1, wherein said electromagnet is energizable by current flowing through said circuit and then prevents disengagement of said blocking means.

5. A structure as set forth in claim 4, wherein said electromagnet is arranged to be deenergized with a predetermined delay following the exposure of said resistor to illumination by a flash unit.

6. A structure as set forth in claim 5, wherein said circuit comprises two transistors and said exposure control device further comprises a normally open main switch connected in series with said capacitor and said source and arranged to close in response to opening of said shutter.

7. A structure as set forth in claim 6, wherein said exposure control device further comprises a normally open working switch connected in parallel with said capacitor and arranged to close temporarily during opening of said shutter.

8. A structure as set forth in claim 1, wherein said shutter comprises two concentric rings and a plurality of shutter blades coupled with said rings and arranged to define an aperture in response to angular displacement of one of said rings with reference to the other ring, said blocking means comprising a portion engageable with said other ring.

9. A structure as set forth in claim 8, further comprising cocking means for moving said rings as a unit so as to place said other ring into a position for engagement with said blocking means, and means for biasing said one ring from cocked position.

10. A structure as set forth in claim 1, wherein each of said windings is connected with one terminal of said capacitor.

References Cited
UNITED STATES PATENTS

| 3,063,354 | 11/1962 | Matulik et al. | 95—10 |
| 3,326,103 | 6/1967 | Topaz | 95—10 |
| 3,336,850 | 8/1967 | Otani et al. | 95—10 |

NORTON ANSHER, *Primary Examiner.*

J. F. PETERS, *Assistant Examiner.*